(12) United States Patent
Freeborg et al.

(10) Patent No.: US 7,925,669 B2
(45) Date of Patent: Apr. 12, 2011

(54) METHOD AND APPARATUS FOR AUDIO/VIDEO ATTRIBUTE AND RELATIONSHIP STORAGE AND RETRIEVAL FOR EFFICIENT COMPOSITION

(75) Inventors: John Winston Freeborg, Madison, WI (US); Franklin Minor Shotwell, Madison, WI (US); Koriana Cali Kent, Madison, WI (US); Matthew Brohn, Madison, WI (US); Joel Dennis Gilbertson, Madison, WI (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 11/095,342

(22) Filed: Mar. 31, 2005

(65) Prior Publication Data

US 2006/0080335 A1  Apr. 13, 2006

Related U.S. Application Data (60) Provisional application No. 60/618,209, filed on Oct. 13, 2004.

(51) Int. Cl.
*G06F 17/30* (2006.01)

(52) U.S. Cl. ...................................... 707/792

(58) Field of Classification Search .................. 707/100; 715/500.1, 723; 725/39, 132
See application file for complete search history.

(56) References Cited

U.S. PATENT DOCUMENTS

| 7,343,414 | B2 * | 3/2008 | Lipscomb et al. | 709/226 |
|---|---|---|---|---|
| 2002/0001395 | A1 * | 1/2002 | Davis et al. | 382/100 |
| 2002/0188621 | A1 * | 12/2002 | Flank et al. | 707/104.1 |
| 2004/0128514 | A1 * | 7/2004 | Rhoads | 713/176 |
| 2005/0169467 | A1 * | 8/2005 | Risan et al. | 380/201 |
| 2006/0031257 | A1 * | 2/2006 | Lipscomb et al. | 707/104.1 |
| 2006/0167784 | A1 * | 7/2006 | Hoffberg | 705/37 |
| 2007/0040928 | A1 * | 2/2007 | Jung et al. | 348/362 |
| 2007/0052856 | A1 * | 3/2007 | Jung et al. | 348/565 |

OTHER PUBLICATIONS

Adobe Photoshop Album 2.0, http://www.adobe.com/products/photoshopalbum/main.html, 2 pages, copyright 2005, exact date unknown but prior to the filing date of the instant application.

\* cited by examiner

*Primary Examiner* — Diane Mizrahi
(74) *Attorney, Agent, or Firm* — Stuart H. Mayer, Esq.; Karin L. Williams, Esq.; Mayer & Williams PC (57) ABSTRACT

The invention provides a method and software for use within audio and video authoring software applications wherein the relationships between the source media files are saved and used as part of a media manager. The software allows the artist to efficiently recall which files were used together, as well as how they were used together musically or visually.

26 Claims, 10 Drawing Sheets

| FIG. 3A |
| --- |
| FIG. 3b |

METHOD AND APPARATUS FOR AUDIO/VIDEO ATTRIBUTE AND RELATIONSHIP STORAGE AND RETRIEVAL FOR EFFICIENT COMPOSITION

CROSS-REFERENCE TO RELATED APPLICATIONS

This application is claims priority to and is a continuation-in-part of U.S. Provisional Patent Application Ser. No. 60/618,209, filed Oct. 13, 2004, incorporated by reference herein in its entirety.

FIELD OF THE INVENTION

The invention relates to digital audio music, and in particular to methods and software for media creation using stored media files.

BACKGROUND OF THE INVENTION

Managing vast quantities of audio, image/picture, and video files for use as source material in compositions is a challenge to musicians, artists, video editors, and so on. Finding the right source material in a time-efficient manner such that the creative process is not disrupted is challenging.

In addition, over time, artists naturally find source material that works well together or they create new derivative material based on existing source files. However, remembering the relationships between the materials is also a challenge.

The file system for most computers forces artists to arrange source material in one manner or "facet": a hierarchical arrangement of folders and file names. If artists wish to categorize a particular media file in multiple ways, they have to waste valuable disk space by making duplicate copies in multiple folders. Maintenance of multiple copies becomes tedious if they are modified or otherwise changed. Hunting through many folders for the proper media file is not time-efficient and can disrupt the creative process and flow of the moment.

SUMMARY OF THE INVENTION

In general, the invention allows flexibility in the creation of audio and video media files. Audio and visual files may have attributes attached relating to themselves and to their relationship with other files, leading to more efficient storage and retrieval for non-disrupted composition.

More specifically, over time, as artists use audio and video authoring software applications according to embodiments of the present invention, the relationships between the source media files are saved. Later, the author can efficiently recall which files were used together, how they were used together musically or visually, and generate new personalized compositions from the information, either manually or automatically.

In particular, a "media manager" may be employed to accomplish the above tasks. The media manager may preferably be a part of audio and/or video composition software or may be a separate stand-alone application.

When the media manager integrates with the composition software the same allows artists to scan their hard disks for media files. The location of each media file found is recorded in a database along with many attributes of the file. Artists may then add metadata in the form of "tags" or comments to each database record. Tags may be thought of as keywords. In an embodiment of the current invention, a flexible user interface is provided of a "tag tree" or "keyword tree" that allows efficient searching based on groups of keywords by placing them at different levels of the tag tree or by reorganizing the tree. A flexible searching mechanism allows the artist to locate media assets from many "facets" such as: tags, file name, tempo range, rating, musical key, duration, keywords, etc.

The media manager may also track how the artist uses creative assets over time automatically, assisting the artist in later editing efforts by allowing easy recall of the relationships between media. The types of relationships that may be stored include: media files that have been used in projects together, media files that have been previewed for possible use in a project, input media files used to create new derivative output media files, etc.

In contrast, existing "audio jukebox" software such as Windows Media Player track the most listened-to files and then automatically create a playlist for them. However, embodiments of the media manager allow storage of media attributes and relationships between files in the composition context. For example, over time, the media manager can build a history of media that the artist has judged to sound good together. It can also store how the media files are edited together, e.g., which tempo is best, which musical key, which type of video transition, etc. This data can then be used in conjunction with other algorithms, described in more detail below, to synthesize a new audio or video composition.

The user interface employed by the artist to express their media search is important to the efficiency of the composition process. The media manager according to an embodiment of the invention may present the media assets in a grid mode, in a multi-column list mode, or in a thumbnail view. In the grid mode, each row is a media asset and each column is an attribute, e.g., tempo. The artist can then select media assets and choose to "FIND RELATED ITEMS" and choose the type of relationship to use to do so. The results are shown immediately and the artist can further filter the results by adding more criteria to the search, e.g., tempo range, duration, etc.

Integrating the media manager within the composition or editing software allows the media assets to be previewed in the context of the current project, enhancing the efficiency of the editing process.

Advantages of certain embodiments of the invention allow media files to be organized with complete flexibility, allowing classifying and searching for media no matter how folders are organized. Other advantages include the use of customizable tagging, allowing organization of media files in many different ways without having to duplicate files in multiple folders. The use of tags, custom columns, searches, and advanced searches allows organization of even a very large collection of media within a single library.

Other advantages will become apparent from the following description, including the figures and claims.

DETAILED DESCRIPTION

A user may start a new project in a number of ways. Once started, the process of adding media to the project may begin.

Figure 1:
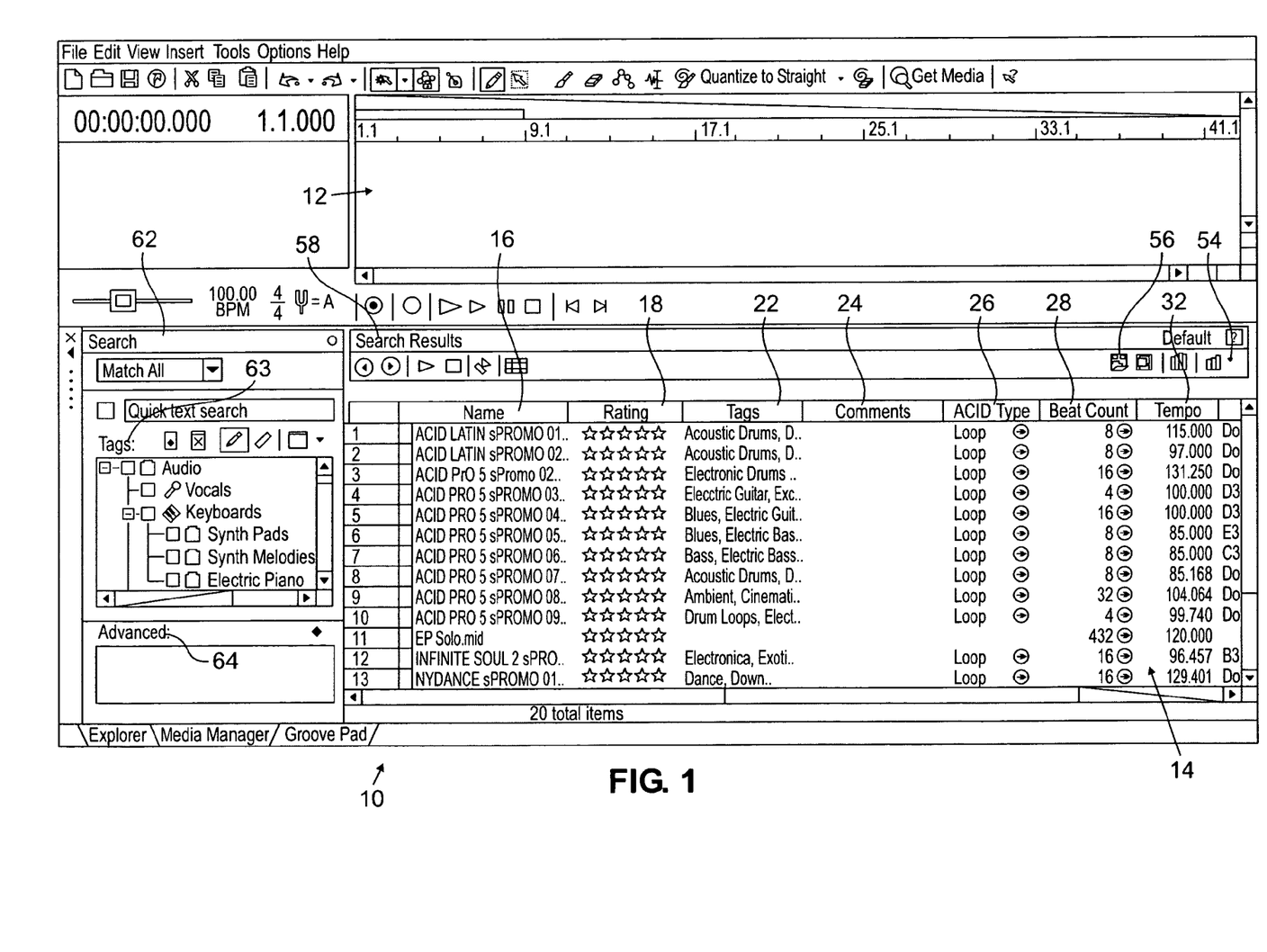
FIG. 1 shows a screenshot of a user interface of a project according to an embodiment of the present invention, showing a media manager.
Figure 2:
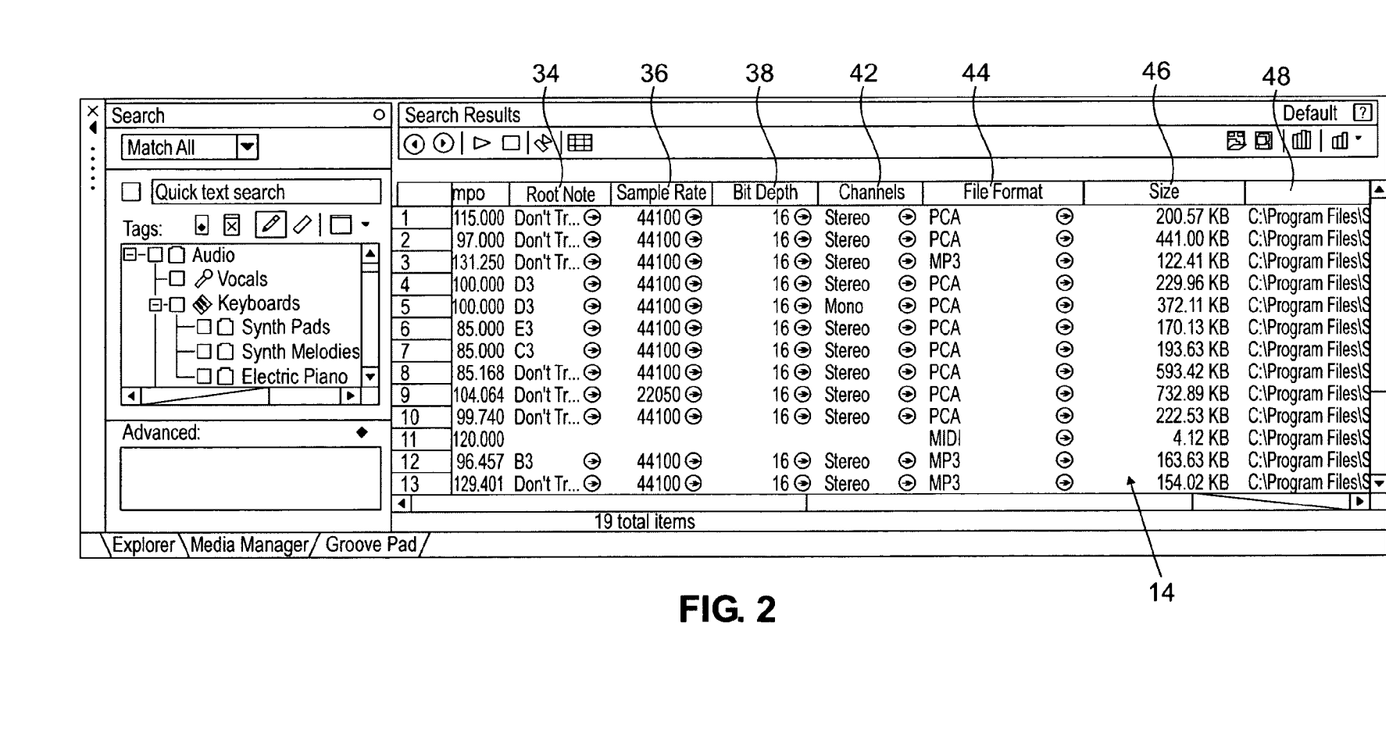
FIG. 2 shows another screenshot of a user interface of a project according to an embodiment of the present invention, showing further details of a media manager.
Figure 3:
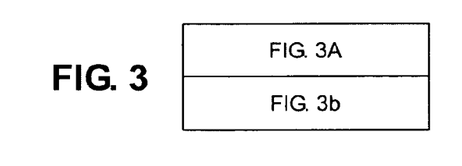
FIG. 3 shows another screenshot of a user interface of a project according to an embodiment of the present invention, showing even further details of a media manager.
Figure 3A:
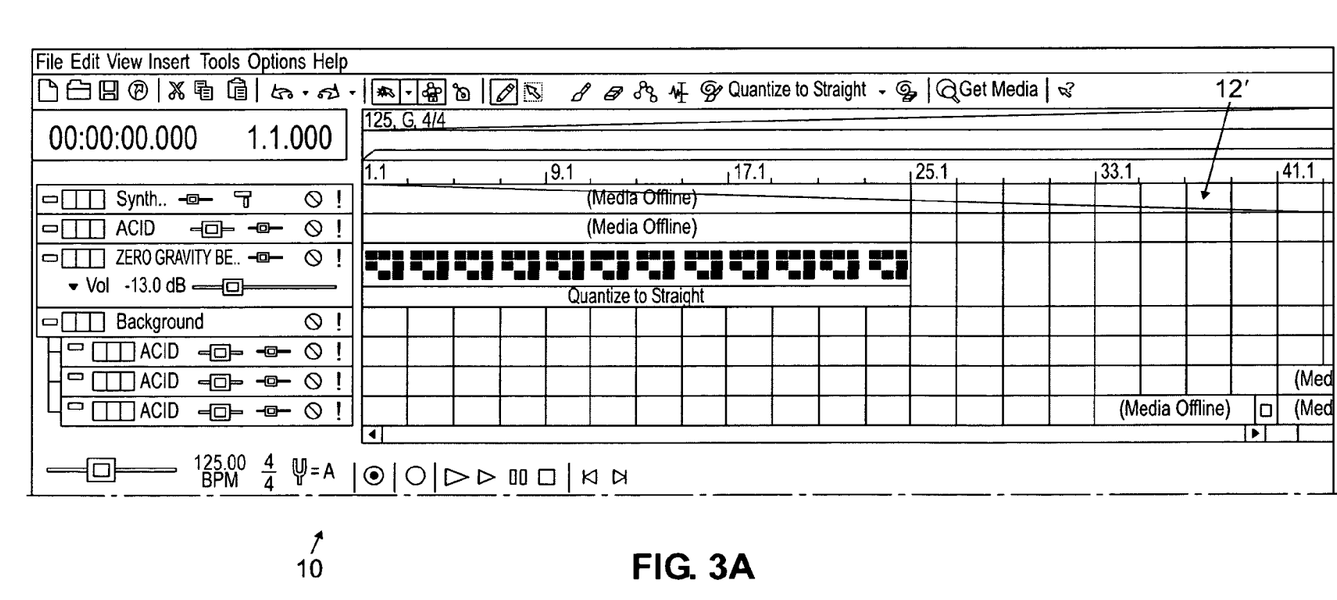
Figure 3B:
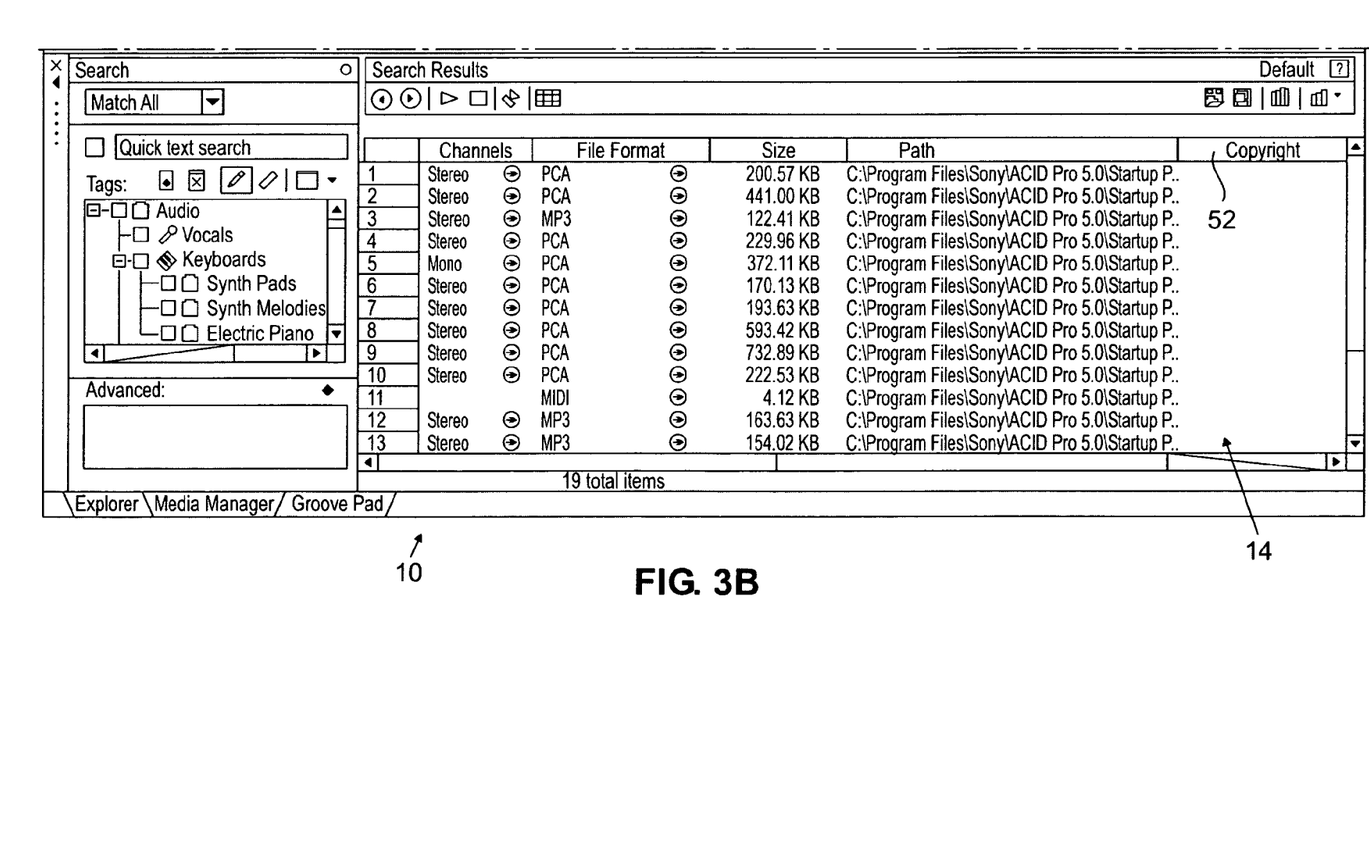

One way to add media to a project is via a media manager. Referring to FIG. 1, an audiovisual composition and editing application having a user interface 10 may have a new project 12 graphically visualized along with a media manager 14. Media manager 14 may have a number of sections or columns appertaining thereto, corresponding to attributes of the media files, including media file name 16, user rating 18, associated tags 22, comments 24, type of media 26, beat count 28, tempo 32, and, referring to FIG. 2, root note 34, sample rate 36, bit depth 38, channels 42, file format 44, size 46, path 48, copyright information 52 (see FIG. 3), and so on. Media files so organized will in general also have file attributes and metadata. Such columns may be customized according to the dictates of the user.

The media manager may be initiated "from scratch", i.e., as a completely new independent database. To create a new media library, a button 54 with a pull-down menu may be employed. When a new library is created, a default tag tree 72 (see FIG. 4), described in more detail below, is displayed in the tags pane 63.

Each media library may serve as an independent database, and multiple libraries may be employed, e.g., to distinguish media from different computers, or to distinguish media from different users of the same computer, etc. In any case, the use of multiple media libraries may improve performance.

A different library may be opened via the same button 54 with a different choice within the pull-down menu.

A media library can also be a reference library available from a third party source or vendor. Tags and custom properties from the reference library may then be applied to media which is newly-added from other sources, e.g., using "ADD FILES TO MEDIA LIBRARY" button 56.

A reference library may also be employed to search for media files that are currently not part of a stored collection. For example, a user could search, using any of the criteria noted as columns above, for a particular type of sound in a reference library to determine if a purchase, from that reference library, is warranted.

Figure 4:
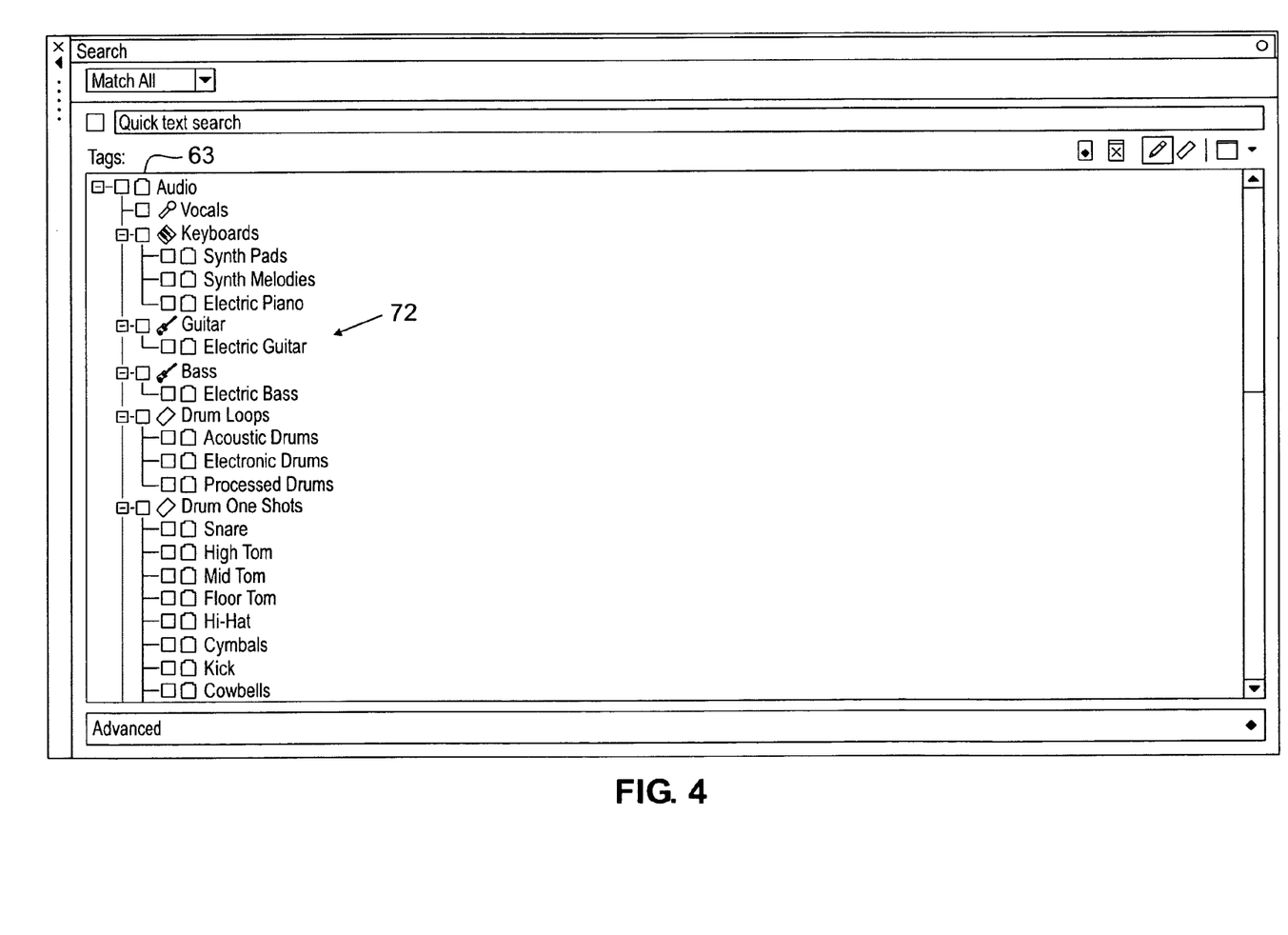
FIG. 4 shows a more detailed view of the search panel, showing a tags pane and a tag tree.

In general, panel 58 shows the SEARCH RESULTS for whatever search is noted in the SEARCH panel 62. A more detailed view of the search panel 62 is shown in FIG. 4.

Figure 5:
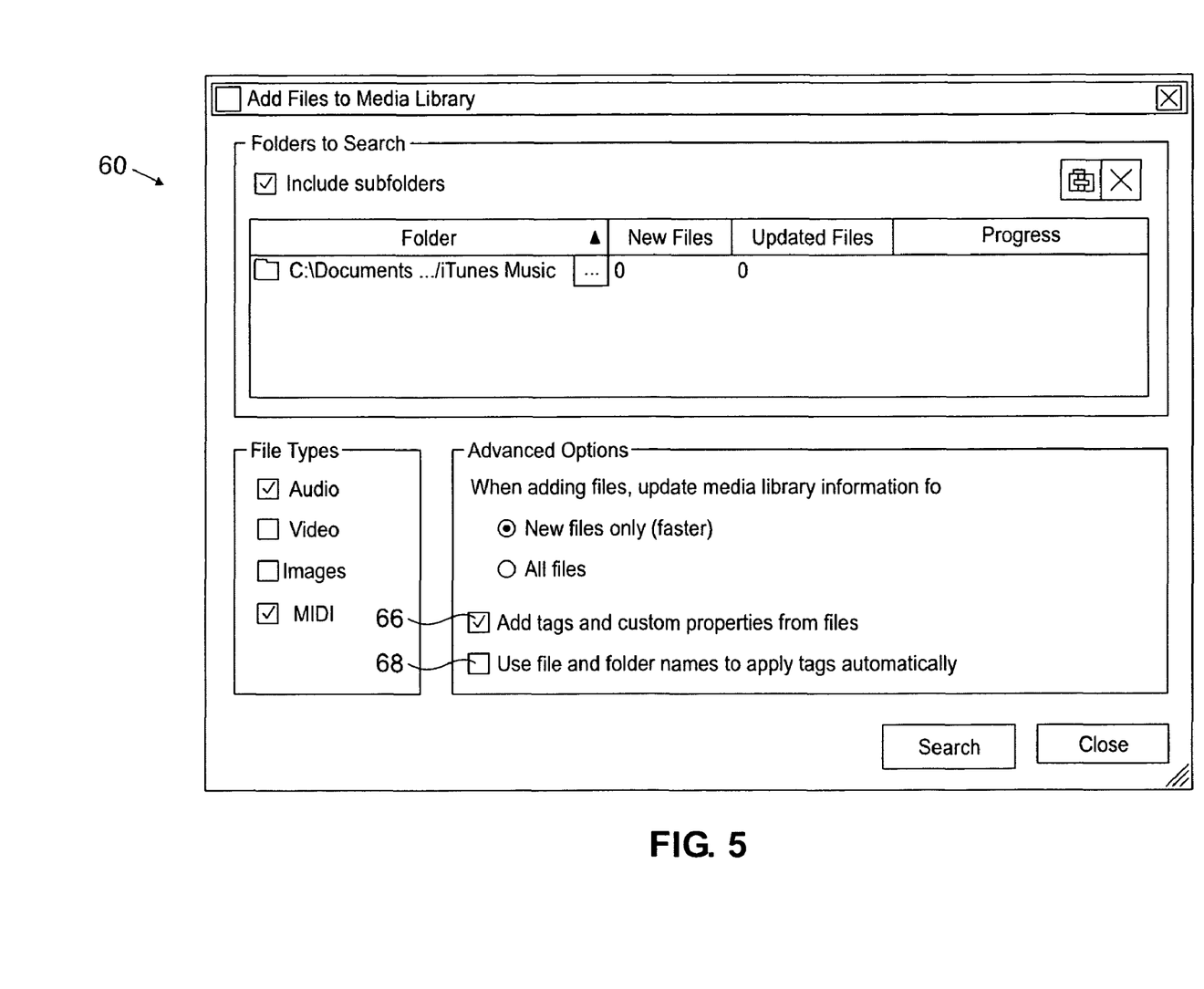
FIG. 5 shows a dialogue box for adding files to a media library.

To add media to a media library, the button 56 may be employed. Button 56 opens a dialogue 60, e.g., that shown in FIG. 5, which may be used to search for media to add to the media library. Tags and custom properties (if present in files) may be automatically added from files using checkbox 66, or files and folder names may be employed to apply tags using checkbox 68, or both. For example, in the latter, a loop saved in the d:\loops\drums\hi-hats\ folder may have the tags DRUMS and HI-HATS applied when it is added to the library. Some synonyms (and variant spellings) may also be employed to resolve discrepancies.

Regarding tags in general, tagging helps in the classification of media files. For example, if the user wished to keep track of loops played by a specific instrument, they could create a tag with the name of the instrument and apply it to the appropriate loops. Similarly, tags could be created for genres, moods, seasons, client names, locations, scenes, performer names, and so on. Tags may be created to customize the tags for the user's needs. Tags are a fast way to search a media library, and they may require very little disk space. Tags point to specific media files with which they are associated.

Tags may be saved in the media library. If a media file exists in multiple libraries, tagging the media file in one library may have no effect on the other libraries unless the user saves the tags to the files and uses the ADD FILES TO MEDIA LIBRARY dialog to update tags and custom properties for all files.

If it is desired to see which tags are associated with a file as tags are being added or removed, the tags column may be dragged in the SEARCH RESULTS pane 14 to the left so that the Name and Tags columns may be seen at the same time.

A tag may be automatically added to the tag tree upon commencement of a search. The tag name may include the date and time of the search, and all files that were added or updated in the library may be marked with this tag. See, e.g., tag 74 in FIG. 6.

To search using tags, the user simply marks the check box or boxes in the tag tree 72 corresponding to the desired type of media file. For example, in FIG. 6, a search of media files having the tag "CINEMATIC/SOUNDTRACK" (tag 76) in the tag tree has turned up a number of files 78, each having CINEMATIC/SOUNDTRACK as one of the elements in their tags column 82.

Figure 7:
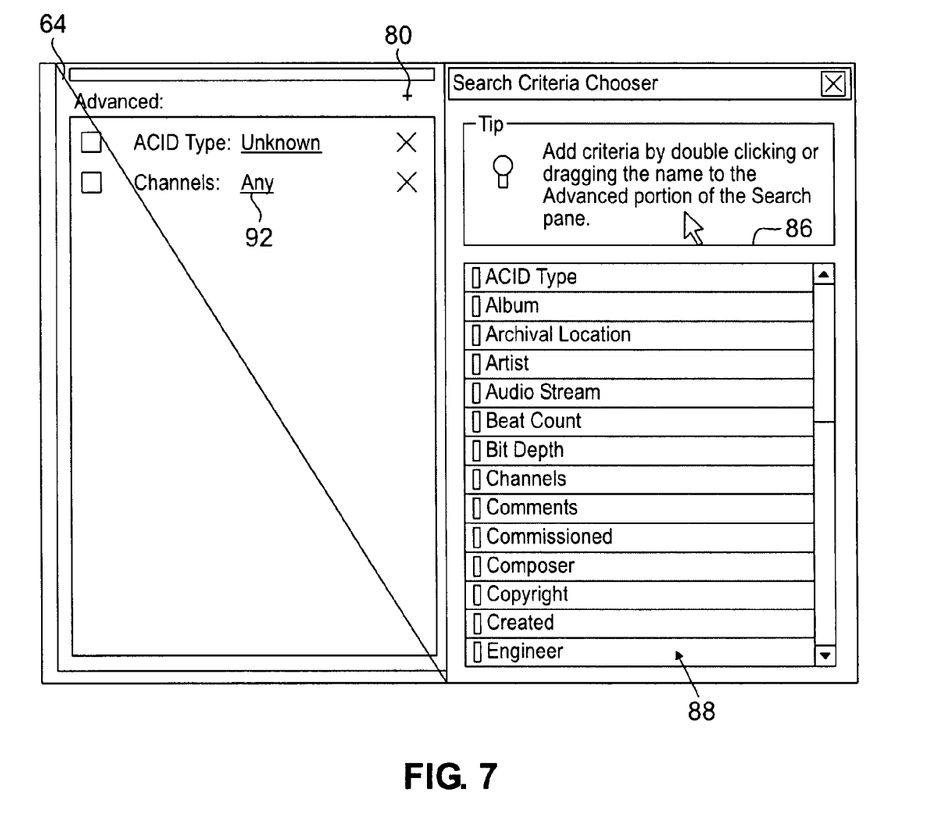
FIG. 7 shows a dialogue box for an advanced search.

An advanced search may also be performed, using ADVANCED SEARCH pane 64. By clicking button 84 corresponding to "ADD NEW SEARCH CRITERIA" criteria chooser 86 is shown. A variety of criteria 88 may be chosen, e.g., by dragging to the left to pane 64, and the parameters for the criteria 88 may be chosen by specifying values in parameter 92.

Figure 6:
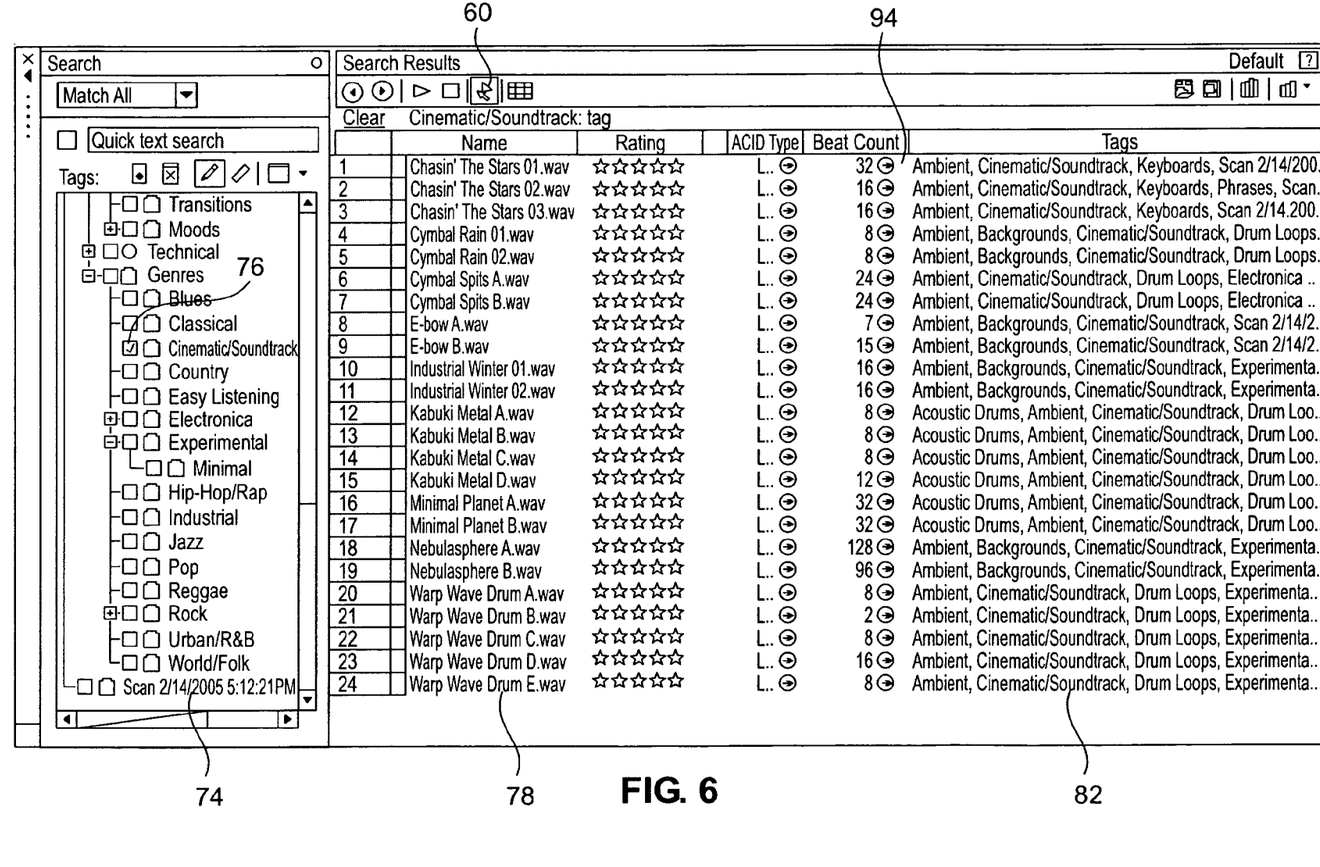
FIG. 6 shows results of a search employing one tag.

Related items may also be found, for some facets, by clicking a button, e.g., button 94 in FIG. 6, which then specifies the search in the pane 14 to only the values corresponding to, e.g., a beat count of 32.

Figure 8:
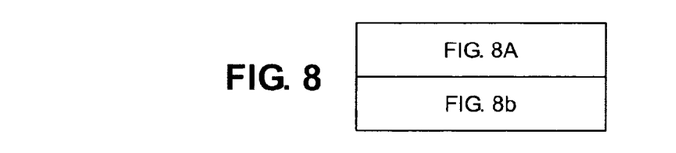
FIG. 8 shows a drop-down menu for a routine to find related items relative to a chosen file.
Figure 8A:
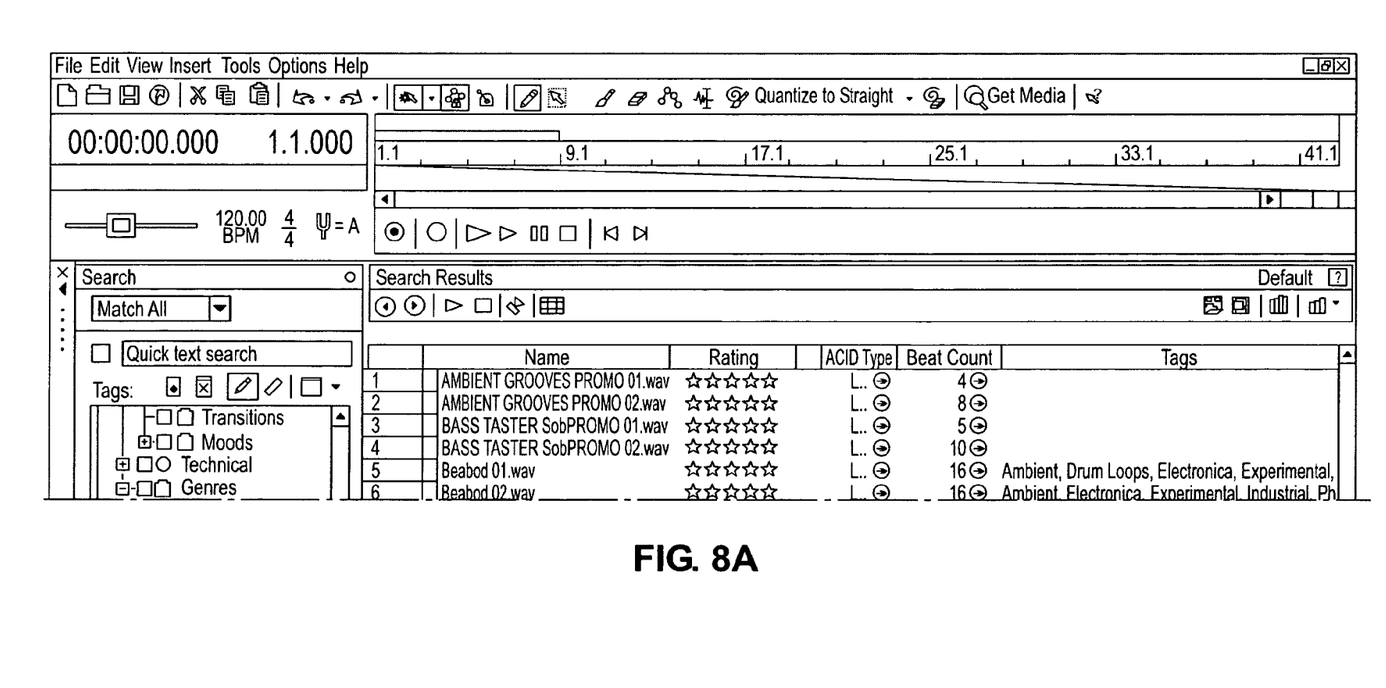
Figure 8B:
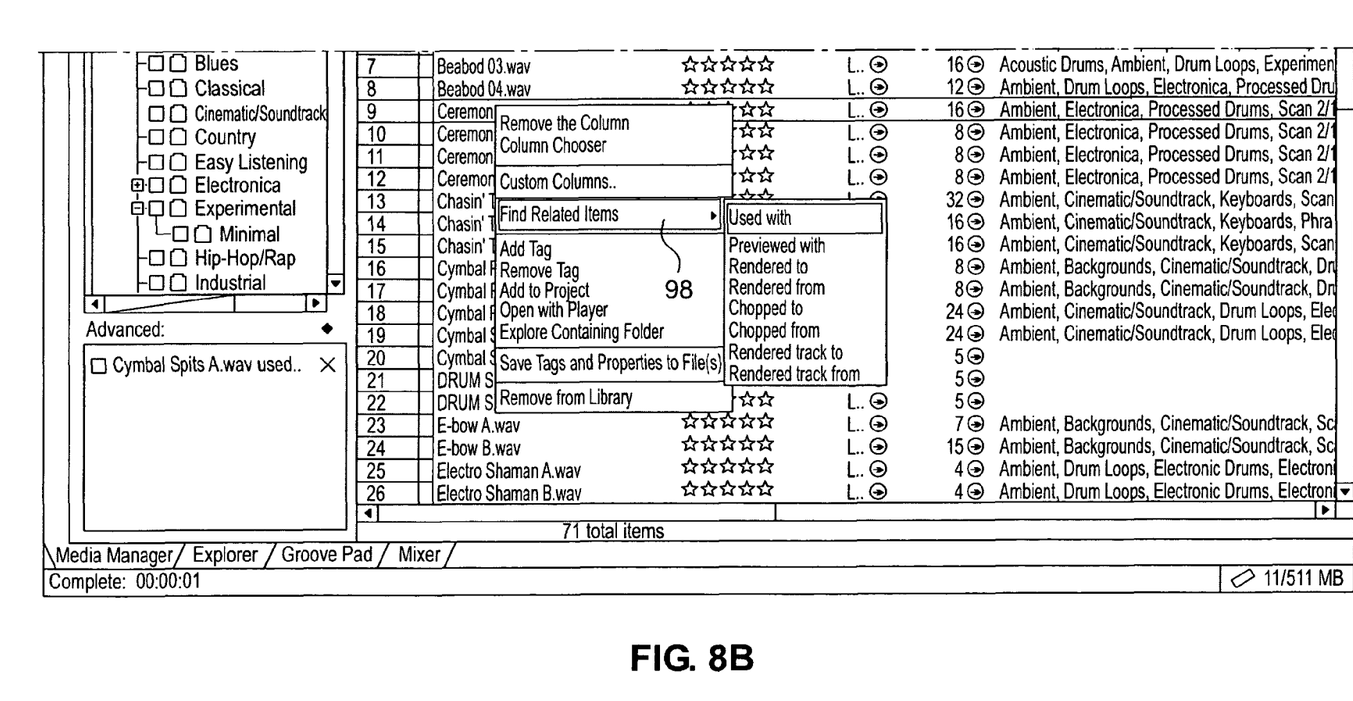

In a more systematic way, related items may be found for any particular file by choosing a FIND RELATED ITEMS menu option 98. In this option, files that have been used together may be located simply by choosing how they were used: whether they employ the same source media, whether they were previewed in a project containing the selected media, etc. In this way, the media manager may track how the artist uses creative assets over time automatically, assisting the artist in later editing efforts by allowing easy recall of the relationships between media. For example, over time, the media manager can build a history of media that the artist has judged to sound good together. It can also store how the media files are edited together, e.g., which tempo is best, which musical key, which type of video transition, etc. The types of relationships that may be stored include: media files that have been used in projects together, media files that have been previewed for possible use in a project, input media files used to create new derivative output media files, etc. Other types of relationships include those related to particular settings. For example, media may be related by the amount of a particular type of DSP audio effect: chorus, reverb, brightness, saturation, motion blur, etc. Media may also be related by a certain range of rendering or quality settings for the codecs. Media may further be related by whether they are simple or complex, as measured by the number of audio buses or video cuts, etc. Media may also be related by style, i.e., a style name could be applied to various styles, and the same may be employed as metadata for grouping purposes. For example, styles may be smooth, aggressive, etc., where a video with more than four transitions per second and a tempo of at least 130 bpm is defined as aggressive. The above-described metatags pertaining to the history of the file and its media relationships are herein termed "creation attributes".

The artist can then select media assets and choose to "FIND RELATED ITEMS" and choose the type of relationship to use to do so. The results are shown immediately and the artist can further filter the results by adding more criteria to the search, e.g., tempo range, duration, etc.

This capability is related to the integration of the media manager with the authoring software. The authoring software may keep track, using metadata, of the creation of new audio or video files as well as what source files and settings were employed to create it.

Tagging new loops may be done in a systematic way so as to match the nomenclature already in place in the library. In particular, a new loop may be added to the library using the ADD FILES TO MEDIA LIBRARY procedure described above. Tags may then be dragged from the tag tree to the file as displayed in the SEARCH RESULTS pane. This action applies the tag to the file, and can be repeated as desired for as many tags as necessary.

Other aspects include providing an "AUTO-PREVIEW" button (see button 96 in FIG. 6) which, when selected, will automatically play selected files. If multiple files are selected, they may be played back sequentially. Integrating the media manager within the composition or editing software allows this feature, e.g., allows media assets to be previewed in the context of the current project, enhancing the efficiency of the editing process. It should be noted that in this context previewing is more than simply hearing the audio clip. If the clip contains musical metadata, embodiments of the audio composition software may automatically adjust the audio to the same tempo and key as the project. This integration is an important advantage over simply storing audio clips as in the prior art.

The invention has been described with respect to certain embodiments. For example, the media file attributes, their relationships, and project composition details have been described as stored in a relational database technology. However, the invention is not to be limited to those embodiments described. For example, the media file attributes, their relationships, and project composition details may be stored in any type of database technology that allows flexible querying. More generally, the invention is limited solely by the claims appended hereto, and equivalents thereof.

The invention claimed is:

1. A method of organizing media files in conjunction with a media authoring application on a computer, comprising:
   populating a media library with a plurality of media files;
   associating with said at least one of said plurality of media files at least one creation attribute of the media file, wherein the creation attribute is based on usage of the selected media file in conjunction with the other files in the media library or in other media libraries;
   storing the creation attribute used in said associating step as to the at least one of said plurality of media files and as to the other files used in conjunction with the at least one of said plurality of media files, in said media library;
   searching said media library, the searching based on the at least one creation attribute; and
   viewing the results found in the searching step in a media authoring application associated with the media library.

2. The method of claim 1, wherein the populating includes searching a source of files for media files and reporting the results of the search.

3. The method of claim 1, wherein the populating includes browsing a source of files for media files and recording a user choice of media files.

4. The method of claim 1, further comprising associating with said at least one of said plurality of media files a tag, the tag corresponding to an attribute of the media file.

5. The method of claim 4, wherein the media library is a reference media library, and wherein the tag is chosen from tags within the reference media library.

6. The method of claim 4, wherein the searching further comprises searching based on a combination of the tag and on a textual component of the plurality of media files.

7. The method of claim 1, wherein the searching includes providing a tag tree wherein at least one tag is chosen and the searching automatically occurs based on the chosen at least one tag.

8. The method of claim 1, further comprising advanced searching said media library wherein the advanced searching includes providing a list of criteria, enabling a choosing of the criteria by a user, enabling the user to choose selected parameters, or a range of parameters, of the criteria, and performing a search based on the parameters of the criteria.

9. The method of claim 1, wherein the media library is a new media library.

10. The method of claim 1, wherein the usage includes: employment of common media files, preview of the other files in a project containing the selected media file or vice-versa, derivative files, files that were rendered to or from each other, files that were chopped to or from each other, files having effects within a predetermined range, files having rendering or quality settings within a predetermined range, or files that fall within a predetermined range of complexity.

11. The method of claim 10, wherein the effects include DSP audio effects.

12. The method of claim 10, wherein the range of complexity is based on the number of transitions in the files.

13. The method of claim 12, further comprising naming a plurality of ranges of complexity according to the number of transitions in the files, and wherein the searching said media library includes the step of searching based on the named ranges.

14. A computer-readable medium, encoded with a computer program, the program for organizing media files in conjunction with a media authoring application on a computer, the computer program comprising instructions for causing an apparatus to:
   populate a media library with a plurality of media files;
   associate with said at least one of said plurality of media files at least one creation attribute of the media file, wherein the creation attribute is based on usage of the selected media file in conjunction with the other files in the media library or in other media libraries;
   store the creation attribute used in said associating step as to the at least one of said plurality of media files and as to the other files used in conjunction with the at least one of said plurality of media files, in said media library;
   search said media library, the searching based on the at least one creation attribute; and
   view the results found in the searching step in a media authoring application associated with the media library.

15. The program of claim 14, wherein the populate step includes searching a source of files for media files and reporting the results of the search.

16. The program of claim 14, wherein the populate step includes browsing a source of files for media files and recording a user choice of media files.

17. The program of claim 14, wherein the computer program further comprises instructions for causing an apparatus to associate with said at least one of said plurality of media files at least one tag corresponding to an attribute of the media file.

18. The program of claim 17, wherein the media library is a reference media library, and wherein the at least one tag is chosen from tags within the reference media library.

19. The program of claim 17, wherein the search is based on a combination of the tag and on a textual component of the plurality of media files.

20. The program of claim 14, wherein the search includes providing a tag tree wherein at least one tag is chosen and the search automatically occurs based on the chosen at least one tag.

21. The program of claim 14, wherein the computer program further comprises instructions for causing an apparatus to perform an advanced search of said media library wherein the advanced search includes providing a list of criteria, enabling a choosing of the criteria by a user, enabling the user to choose selected parameters, or a range of parameters, of the criteria, and performing a search based on the parameters of the criteria.

22. The program of claim 14, wherein the media library is a new media library.

23. The program of claim 14, wherein the usage includes: employment of common media files, preview of the other files in a project containing the selected media file or vice-versa, derivative files, files that were rendered to or from each other, files that were chopped to or from each other, files having effects within a predetermined range, files having rendering or quality settings within a predetermined range, or files that fall within a predetermined range of complexity.

24. The program of claim 23, wherein the effects include DSP audio effects.

25. The program of claim 23, wherein the range of complexity is based on the number of transitions in the files.

26. The program of claim 25, wherein the computer program further comprises instructions for causing an apparatus to name a plurality of ranges of complexity according to the number of transitions in the files, and wherein the search of said media library is based on the named ranges.

* * * * *